US 6,567,256 B1

(12) United States Patent
Schweitzer, III

(10) Patent No.: US 6,567,256 B1
(45) Date of Patent: May 20, 2003

(54) DUAL PROTECTIVE RELAY FOR POWER SYSTEMS

(75) Inventor: Edmund O. Schweitzer, III, Pullman, WA (US)

(73) Assignee: Schweitzer Engineering Labs, Inc., Pullman, WA (US)

( * ) Notice: Subject to any disclaimer, the term of this patent is extended or adjusted under 35 U.S.C. 154(b) by 0 days.

(21) Appl. No.: 08/416,436

(22) Filed: Mar. 31, 1995

Related U.S. Application Data

(63) Continuation of application No. 08/103,077, filed on Aug. 6, 1993.

(51) Int. Cl.[7] ............................................... H01H 47/32
(52) U.S. Cl. ......................... 361/185; 361/16; 361/18; 361/31; 361/48; 361/62; 361/64; 361/66; 361/93
(58) Field of Search ........................ 361/16, 18, 31, 361/48, 62–64, 66, 93, 185, 85–87; 307/18–22, 84–87, 38–39

(56) References Cited

U.S. PATENT DOCUMENTS

| | | | | |
|---|---|---|---|---|
| 3,697,773 A | * | 10/1972 | Reitan | 307/85 |
| 3,818,237 A | * | 6/1974 | Straus | 307/64 |
| 3,949,272 A | * | 4/1976 | Smith | 361/64 |
| 4,297,741 A | * | 10/1981 | Howell | 361/93 |
| 4,389,694 A | * | 6/1983 | Cornwell, Jr. | 361/48 |
| 4,408,246 A | * | 10/1983 | Ray | 361/64 |
| 4,772,977 A | * | 9/1988 | Bottrell et al. | 361/23 |
| 4,864,453 A | * | 9/1989 | Bergman et al. | 361/66 |
| 4,937,757 A | * | 6/1990 | Dougherty | 361/97 |
| 4,939,617 A | * | 7/1990 | Hoffman et al. | 361/64 |
| 5,150,270 A | * | 9/1992 | Ernst et al. | 361/64 |

* cited by examiner

*Primary Examiner*—Albert W. Paladini
(74) *Attorney, Agent, or Firm*—Jensen & Puntigam

(57) ABSTRACT

The relay obtains three-phase current signals from two power line sources thereof, typically two independent feeder lines. The two sets of signals are processed by a single processing means, which independently controls the circuit breakers associated with each feeder line, depending on the values of current obtained.

4 Claims, 2 Drawing Sheets

DUAL PROTECTIVE RELAY FOR POWER SYSTEMS

This is a continuation of application Ser. No. 08/103,077 filed on Aug. 6, 1993.

TECHNICAL FIELD

The present invention concerns protective relays for power systems, and more particularly concerns a multifunction relay used primarily to protect feeder lines in a power system.

BACKGROUND OF THE INVENTION

FIG. 1 shows the conventional approach to protecting feeder line portions of a power system. A plurality of feeder lines extend from a distribution bus, with laterals extending off each feeder line to the individual customers. Each feeder line has its own circuit breaker. In FIG. 1, a distribution bus 10 is connected to the secondary of a power system transformer (not shown), with the transformer secondary typically grounded-wye. Extending from the distribution bus 10 are the feeder lines, with feeder lines 12 and 14 being shown in FIG. 1. Each feeder, i.e. feeder 12, has, as indicated above, a circuit breaker 16 associated therewith, along with four protective relays, 20–23, which receive the power signal current through current transformers (CTs) on the feeder line. There is typically one relay for each phase of the power signal (A,B,C) and one (N) for the residual current.

Each of the four relays 20–23 will include one or perhaps two relay elements. A two-element relay will typically include one element which operates instantaneously for high overcurrent conditions, while the other element operates with a time delay depending upon current level. In the arrangement of FIG. 1, any one element in any relay 20–23 can trip circuit breaker 16. The above scheme provides redundancy for any phase-to-phase fault, e.g. an AB fault, since the fault current flows through two separate relays. Three-phase (phase-to-phase-to-phase) faults are also redundantly protected (three separate relays). The conventional arrangement of FIG. 1 is still in wide use because it clearly provides two results which have historically been very important to the power engineer, namely, specific redundant protection (if one relay goes out, there is a direct backup) and relay-line autonomy, i.e. each protective relay is associated with a particular line.

The conventional scheme has been traditionally favored even though it does have several disadvantages—it is typically quite expensive, there are a large number of relays to mount and connect, there is not a true redundancy for the residual current relay, and there are no support functions provided, i.e. event reporting, reclosing, etc.

FIG. 2 shows a more current approach to protecting feeder lines using a single multifunction relay (MFR), with one relay for each feeder line. In this approach, a single relay, i.e. relay 28, provides overcurrent protection for each phase of the power signal current and the residual current on a feeder line 29. Relay 28 controls a circuit breaker 30. Multifunction relays are computer-based, in which the functions of the previous individual relay elements are implemented in software in a microprocessor. This approach is desirable since it retains the desired feature of relay-feeder line autonomy, is capable of providing supporting information and functions, including event reporting and reclosing, and is less expensive generally and easier to install.

However, the multifunction relay approach has been questioned because of a lack of apparent reliability (i.e. redundancy), although the relay typically has a self-test alarm feature so that if the relay does in fact fail, an alarm contact will close and the relay can be conveniently replaced. Further, another relay, referred to as a bus backup relay 32, has been used upstream of the feeder lines, controlling circuit breaker 34 for the bus 35, and is designed to trip the breaker 34 if a fault should occur on a feeder line where the feeder relay has failed. Relay 32 operates off the secondary of the distribution line transformer 36. The multifunction relay approach of FIG. 2 does achieve cost savings and has achieved considerable acceptance in the industry.

In another attempt, which has never been commercially implemented, a single computer-controlled system was used to provide protection for a large number of individual feeder lines, i.e. all of the feeders in a particular power substation. This system was experimental but did not work and in any event was considered to be fundamentally unacceptable because of a lack of reliability (the failure of the computer meant loss of all protection for all the feeder lines) and because the protection was basically too integrated, i.e. there was no separate autonomy (correlation) between a given relay and a specific feeder line. Thus, the industry has to date steadfastly maintained a one-to-one relay-to-feeder approach.

SUMMARY OF THE INVENTION

Accordingly, the present invention is a dual protective relay for protecting power systems, comprising: means for obtaining current signals for each of three phases of power signals from at least two power line sources thereof, each source having associated therewith a circuit breaker system for interrupting power on the power line associated therewith; a single processing means for processing said current signals relative to selected threshold values; and means for operating the circuit breaker system for the particular power line source when the processing means indicates a fault condition thereon.

BEST MODE FOR CARRYING OUT THE INVENTION

Figure 3:
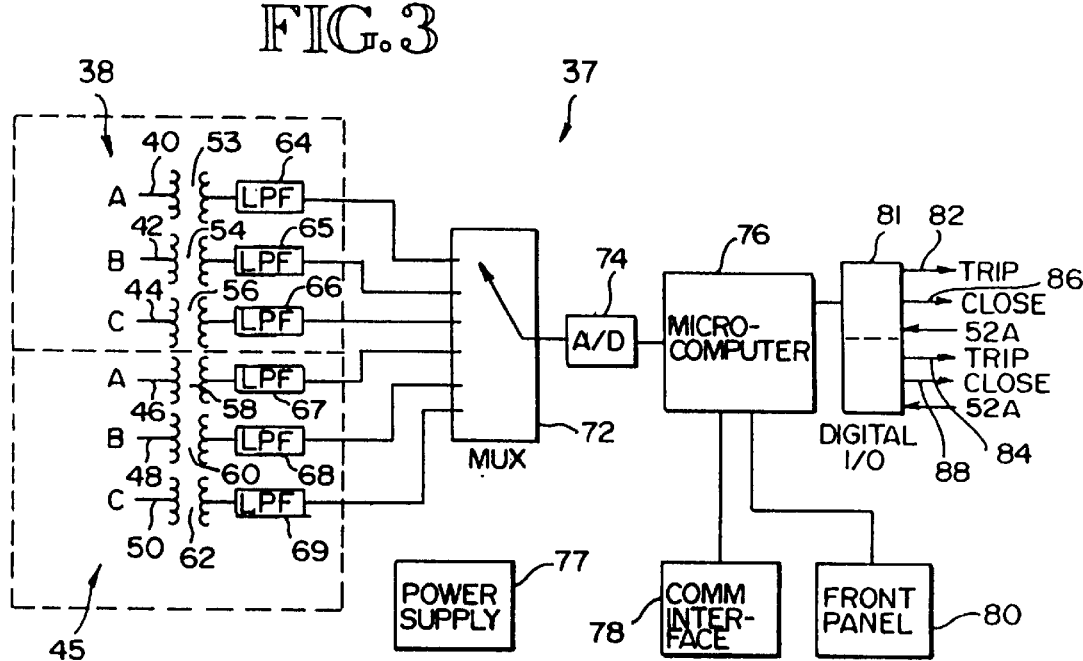
FIG. 3 is a block diagram showing the system of the present invention.

FIG. 3 shows a block diagram of the dual feeder protective relay 37 of the present invention. In this invention, current for each of the three phases (A,B,C) of the power signal is obtained from two separate, independent feeder lines. Currents from one feeder line 38 are on input lines 40, 42 and 44, while currents from the other feeder line 45 are on input lines 46, 48 and 50. The feeder current has already been reduced to a nominal 5 amperes by the feeder line current transformers. The currents to the relay 37 from feeder line 38 are first applied through current transformers (CTs) 53, 54 and 56, which typically reduce the current by a factor of 50 to approximately 0.1 amperes. The currents to relay 37 from feeder line 45 are applied to similar current transformers 58, 60 and 62. The resulting signals from the current transformers at the input of the relay 37 are then applied through low pass filters, respectively, 64 through 69, and from there to a multiplexer 72. From the multiplexer, the signals are applied to an A/D converter 74, which samples the signal at a selected rate (typically 16 times per cycle). A microprocessor 76 is responsive to the signals from A/D converter 74 and performs the relay comparison functions, in conventional fashion. A power supply 77, communications interface 78, and front panel 80 are all part of the relay 37. The output from microprocessor 76 is applied to an input/output assembly 81, which produces trip signals on trip output lines 82 or 84, respectively, in the event of a fault on feeder lines 38 or 45. "Close" output lines 86 and 88 are for reclosing the circuit breakers, either manually or automatically, and the "52A" input lines (industry nomenclature) receive input information from the circuit breaker contacts for each feeder indicating that its circuit breaker has been tripped.

Hence, in the present invention, a single processing system, i.e. multiplexer 72, A/D converter 74 and microprocessor 76, along with power supply 77, interface 78, front panel 80 and I/O 81, is used for protection of two separate feeder lines. The microprocessor 76 reads the input currents from each feeder line separately and performs the necessary calculations and determinations for each set of currents. The single processor further handles all metering, event reporting, self-test and communication functions for both feeder lines.

Figure 2:
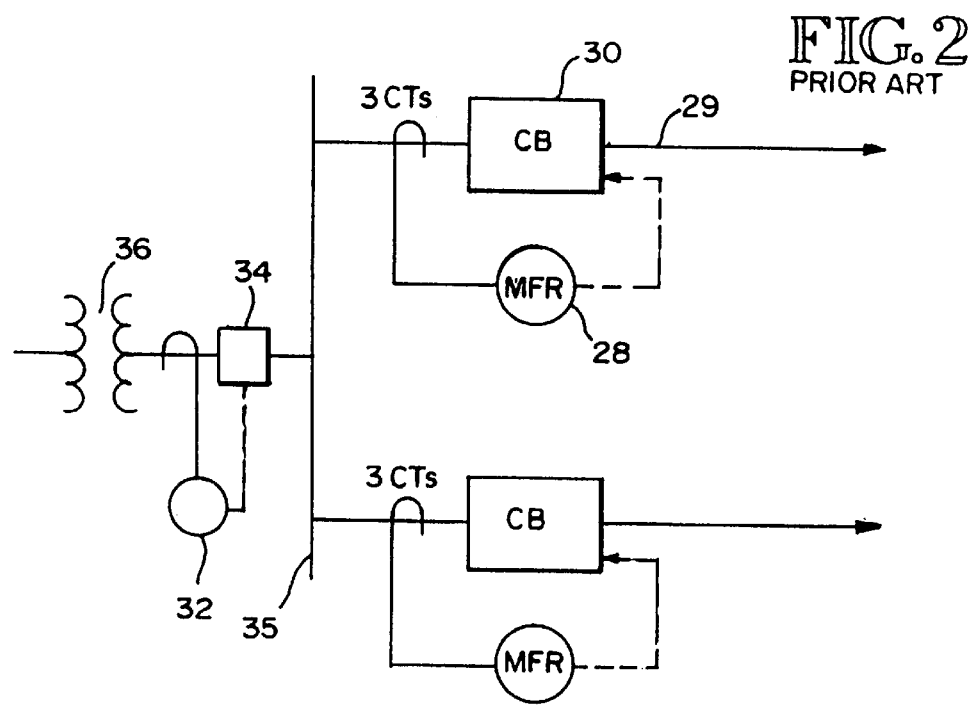
FIG. 2 is a diagram showing another prior art feeder protection system.

In the present invention, a single relay is thus used to independently protect two feeder lines. This arrangement retains a significant amount of autonomy, i.e. direct association between the relay and specific feeder lines, without reducing significantly the redundancy of a traditional multifunction feeder relay system (FIG. 2). The invention has the very significant advantage, however, of significantly reducing the overall cost of feeder protection. This has the follow-on advantage of permitting more feeder lines for the same customer area, which will result in more reliable service for the overall system, i.e. a fault and subsequent trip will result in fewer people being out of service. The system of FIG. 3 is shown in simplified form in FIG. 4, with a single distribution bus 92, two feeder lines 94 and 96 with their associated circuit breakers 98, 100, and a single dual-protective relay 102 of the present invention. The relay 102 shows the separate input and outputs associated with each feeder (Fdr).

Figure 1:
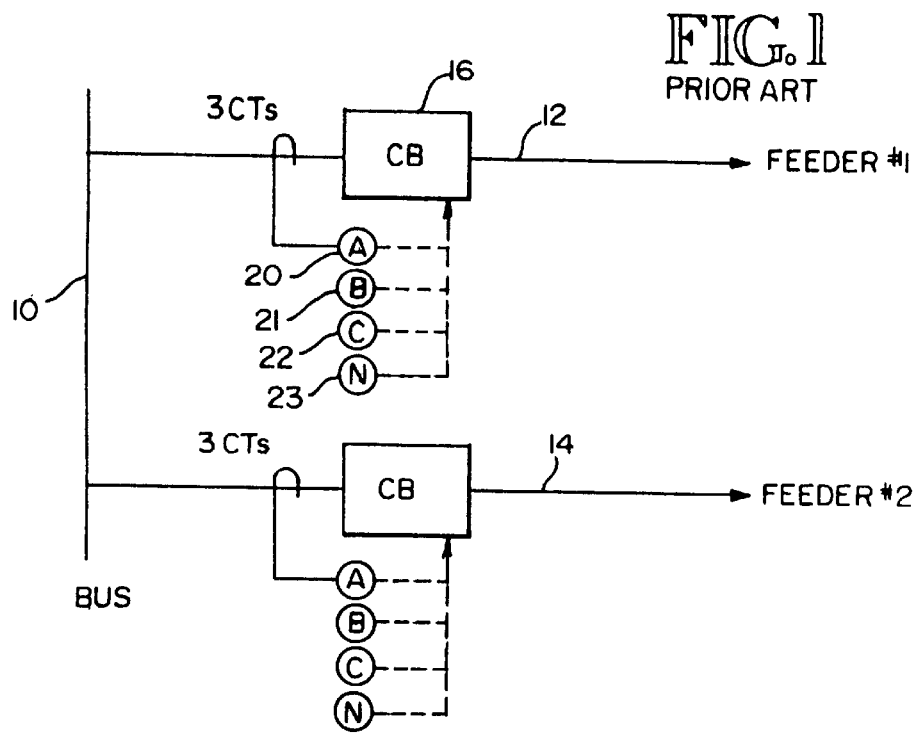
FIG. 1 is a diagram showing one prior art feeder protection system.
Figure 4:
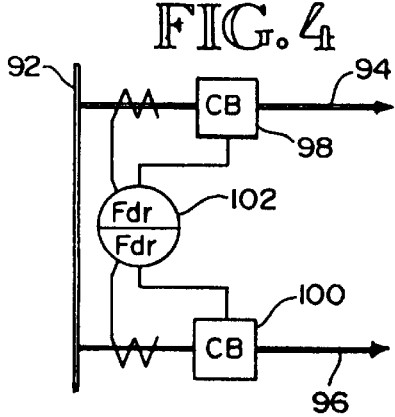
FIG. 4 is a diagram of one application of the system of the present invention.
Figure 5:
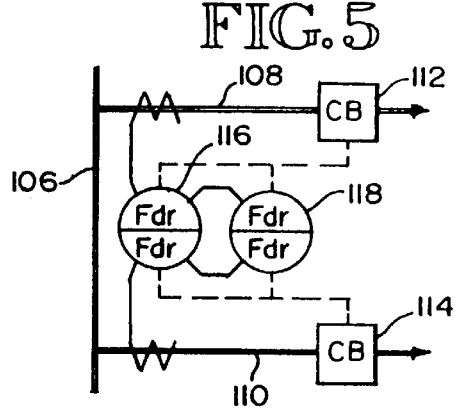
FIG. 5 is a diagram of another application of the system of the present invention.

Adequate reliability for the dual relay of FIG. 4, protecting two feeder lines with a single relay, is provided by the self-test system within the relay, and by using a backup distribution bus relay such as described above with respect to FIG. 2. This arrangement has proven to provide adequate redundancy. However, the dual relay of the present invention can be used in parallel to provide a completely redundant protection system, instead of protecting two feeder lines with only one relay. This arrangement is shown in FIG. 5. A distribution bus 106 with two feeder lines 108 and 110 and their associated circuit breakers 112 and 114 are protected by two identical dual relays 116 and 118. Since the two relays 116 and 118 are in parallel, if relay 116 should fail, 118 provides fully redundant protection. Hence, the present invention provides a completely redundant multifunction capability at approximately the same cost as two conventional multifunction relays previously used to protect the same two feeder lines. The arrangement of FIG. 5 is particularly useful when redundancy is vitally important. Even the system of FIG. 1 does not provide comparable reliability.

Hence, the present invention can be used conveniently either to provide low cost feeder protection for two feeder lines, or two such relays can be used in parallel to provide completely redundant protection for two feeder lines.

Figure 6:
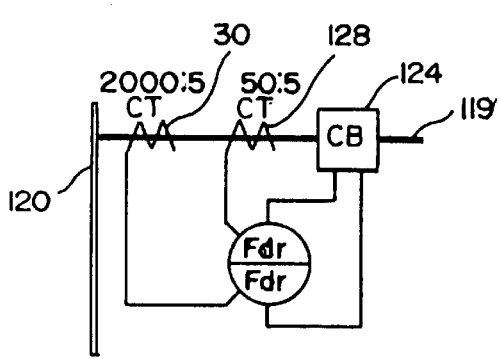
FIG. 6 is a diagram of another application of the present invention.

FIG. 6 shows a further application of the dual relay of the present invention. As indicated above, the nominal full load current at the secondary of the current transformers on the feeder lines is approximately five amperes, while the maximum secondary current which is achieved, for instance, during fault conditions is typically 100 amperes. However, in certain circumstances such transformers are well short of necessary capability, i.e. a distribution bus fault may result in a current of 20,000 amperes at the primary of the feeder current transformer, which far exceeds the capability of that transformer.

The dual relay in FIG. 6 permits the use of two current transformers on a single feeder line. A feeder line 119 extends from a distribution bus 120 with the feeder line 119 having a circuit breaker 124 associated therewith. One current transformer 128 would be conventional, having a 10-1 ratio, while a second current transformer 30 would have a 400-1 ratio, covering fault currents up to 40,000 amps. The present invention thus permits the relay to continue operation even in the event of very high fault currents, for which a conventional current transformer would be highly saturated.

Figure 7:
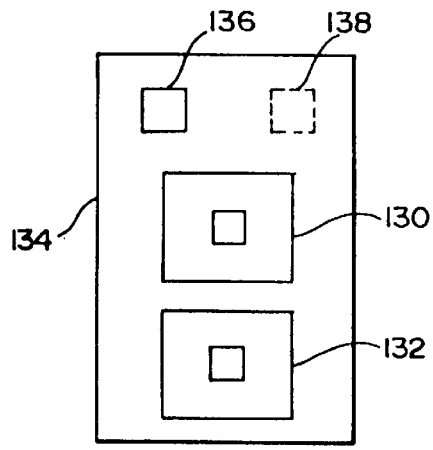
FIG. 7 is a simplified diagram showing installation of the system of the present invention in a power substation.

FIG. 7 shows a typical installation of the relay of the present invention in a so-called "two-high" mounting arrangement of metal-clad switch gear in a power substation. Circuit breakers 130 and 132 for two feeder lines are mounted one above the other in a single panel 134. A single dual relay 136 can be mounted at the top of the two-high panel 134, along with a parallel relay 138 if desired.

In addition to the above, other applications of the dual relay of the present invention are possible, including one dual relay being used to protect a feeder and for circuit breaker failure protection. In still another application, two separate motors, serviced by two feeder lines, could be protected with a single relay. Still other applications are possible. The present invention thus goes against the basic trend in the art by providing a relay which slightly decreases autonomy (two feeders for each relay instead of one), but provides significant operational advantages which ultimately permit substantial improvement in system expense, without sacrificing reliability compared with existing feeder protection approaches using multifunction relays.

Although a preferred embodiment of the present invention has been disclosed for purposes of illustration, it should be understood that various modifications and substitutions may be incorporated in the embodiment without departing from the spirit of the invention which is defined by the claims which follow.

What is claimed is:

1. A dual protective relay for protecting power systems, comprising:

means for obtaining electrical current signals for each of three phases of power signals from at least two separate, independent power line sources thereof, each power line having associated therewith a separate, independent circuit breaker system for interrupting power on its associated power line;

a single processing means for processing said current signals from both of said power line sources relative to selected threshold values to determine fault conditions on both of said power lines and to develop fault signals associated therewith if fault conditions are determined; and means responsive to a fault signal from the single processing means for operating the circuit breaker system associated with that power line, of said two independent power lines, on which a fault condition has been determined.

2. An apparatus of claim 1, wherein the two power line sources are two independent feeder lines and the circuit breaker system comprises separate circuit breakers uniquely associated with each feeder line.

3. A system of claim 2, including two dual relays connected in parallel, providing completely redundant protection for said two feeder lines.

4. A system of claim 2, wherein said two feeder lines are each connected to electric motors.

* * * * *